(No Model.)
J. C. F. SCAMMON.
MACHINE FOR MAKING WOODEN TOOTHPICKS.
No. 539,011. Patented May 7, 1895.
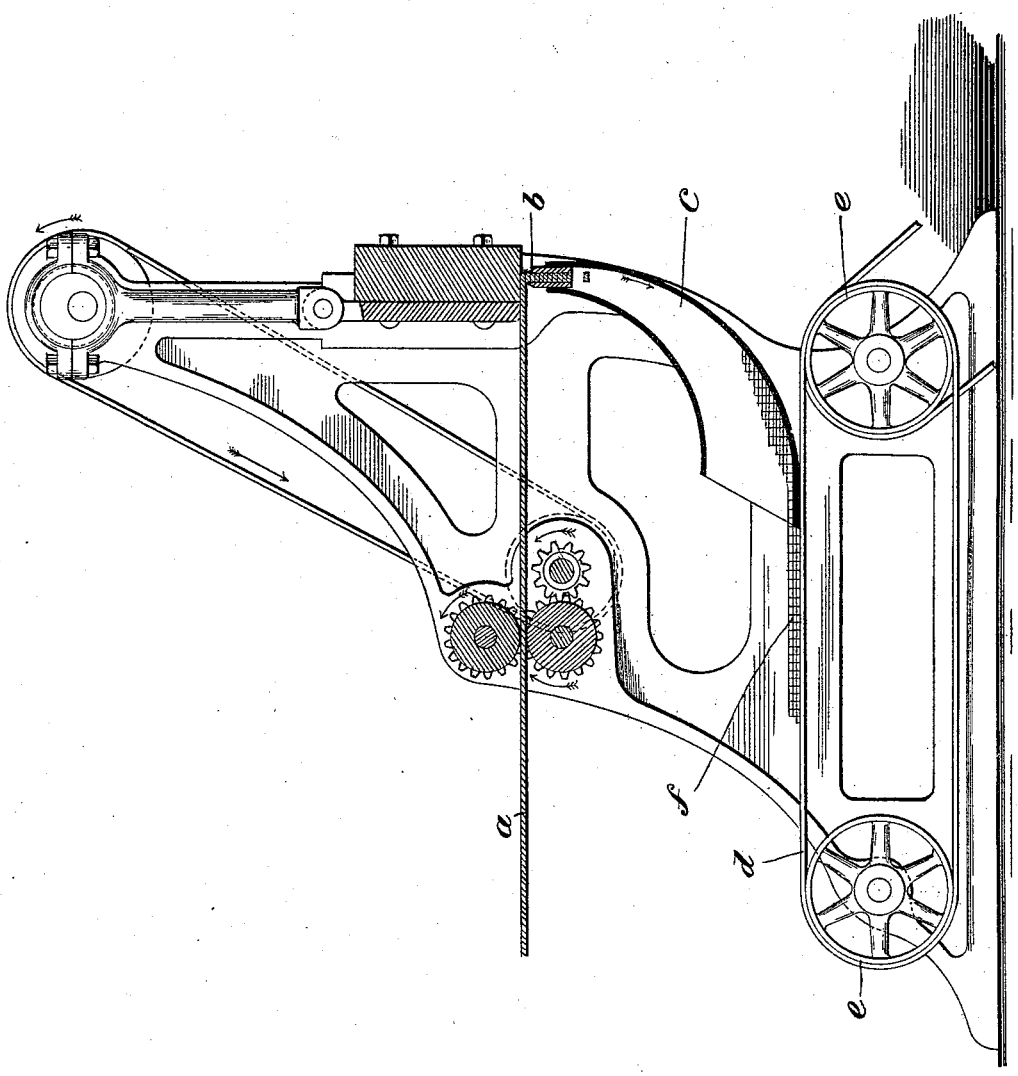
WITNESSES
Estella Barry.
Geo. L. Rehm
INVENTOR
John C. F. Scammon
by Chas. H. Drew
Attorney

UNITED STATES PATENT OFFICE.

JOHN C. F. SCAMMON, OF ANDOVER, ASSIGNOR TO CHARLOTTE M. FORSTER, OF PORTLAND, MAINE.

MACHINE FOR MAKING WOODEN TOOTHPICKS.

SPECIFICATION forming part of Letters Patent No. 539,011, dated May 7, 1895.

Application filed October 11, 1886. Serial No. 215,954. (No model.)

*To all whom it may concern:*

Be it known that I, JOHN C. F. SCAMMON, a citizen of the United States, residing at Andover, in the county of Oxford and State of Maine, have invented certain new and useful Improvements in Machines for Making Wooden Toothpicks; and I do hereby declare that the following is a full, clear, and exact description of the invention, which will enable others skilled in the art to which it appertains to make and use the same.

My invention relates to an improvement in machines for making wooden tooth picks; and it consists in a tube which is open at both of its ends, for receiving and delivering the picks as they are cut from the blanks, and which is curved from a vertical to a horizontal plane, and is made flaring gradually from its top to its lower end, and with which may be combined an endless belt arranged just below the end of the tube, and upon which the tooth picks are delivered from the tube and carried away, as will be more fully described hereinafter.

The object of my invention is to provide an attachment for that class of machines in which the picks are cut from a blank by a series of reciprocating movements that are timed to the feed of the blank, and which attachment receives the picks as they fall and delivers them in their proper position to the operator, who removes them in large bunches from an endless belt which moves the picks slowly from the end of this attachment.

In the accompanying drawing my attachment is shown partly in section and in connection with a well-known type of machines for cutting wooden toothpicks from a blank.

$c$ represents a receiving tube which is placed just below and in front of the table, and which has its upper end either provided with a suitable die or cutter $b$ for severing the picks from the blank or strip of wood $a$, or has its end placed just below such a die or cutter so as to receive the picks as rapidly as they are cut, and which die is the shape of the tooth pick. The upper end of this tube is just wide enough to receive one pick at a time, but not so large that two picks can pass down side by side. The horizontal length of the tube is sufficient to allow the picks to fall freely, but never to reverse their ends, nor to become displaced in any manner. From just below the throat of this tube it is curved gradually to a horizontal line and increases in size to its lower end, so as to prevent the picks from clogging, sticking, or packing therein, and so that the picks will be fed from their own gravity down upon the horizontal part and to the endless belt $d$, arranged just below and also against the lower end of the tube. The large flaring end of the tube also allows the picks in the lower end to be freely removed in batches whenever desired by hand or an implement of any kind. As the endless belt $d$ advances, its motion being properly timed with the motion of the cutting knife, the picks fall together upon the belt from the lower end of the tube, and are carried away to any desired point.

The strip or blank of wood from which the picks are cut is such as is shown in the patent to B. F. Sturtevant, No. 38,768, dated June 2, 1863, and the forward motion of the strip is so timed that it moves a distance equal to the width of a pick in the time required for the rise and fall of the knife.

The vertical fall of the pick being gradually effected by the curve of the tube $c$, into the horizontal, the picks are gathered without permitting their disarrangement, and may be removed in bunches from the large end of the tube, or from the belt $d$, which acts to sufficiently clear the end of the tube to prevent clogging.

The cutting machine shown is only a type of that class shown in my own patent, No. 501,105, and described in the specification, and hence there is no need to describe it here, or show it more fully in the drawing, as it forms no part of this invention.

Having thus described my invention, I claim—

1. As an attachment for a tooth pick machine, a receiving tube for the picks, having a narrow throat and an enlarged lower end, and curved gradually from the vertical to the horizontal, thus acting to gather the splints without permitting their disarrangement, and which serves to deliver the picks in bulk, substantially as shown.

2. In a tooth pick machine, a receiving tube for the picks, having a narrow throat, and an enlarged lower end, and curved gradually from the vertical to the horizontal, thus acting to gather the splints without permitting their disarrangement, and which serves to deliver the picks in bulk, combined with a carrier belt placed below the lower end of the tube, substantially as described.

JOHN C. F. SCAMMON.

Witnesses:
ANSON M. LYMAN,
CHAS. H. DREW.